Feb. 15, 1949.　　　　M. L. MOSIER　　　　2,461,913
GAS BURNER AND SUPPORT THEREFOR
Filed Oct. 24, 1947
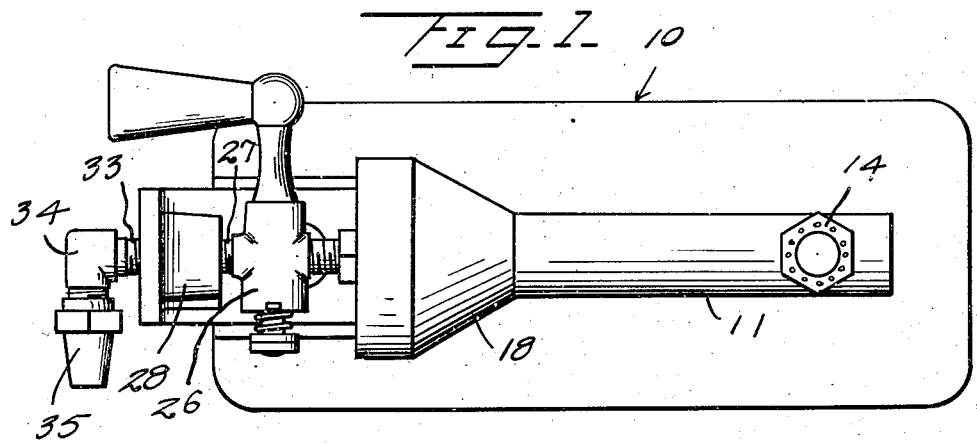
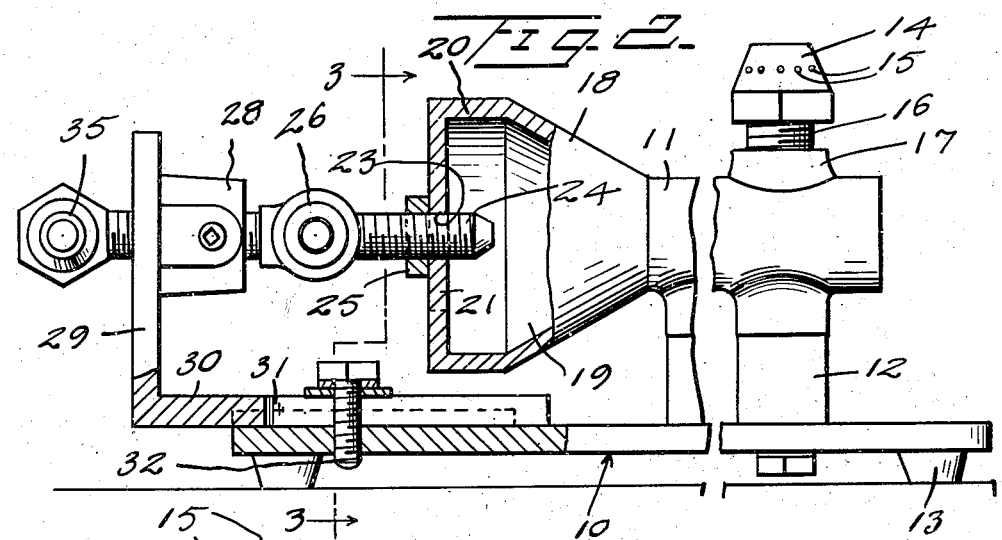
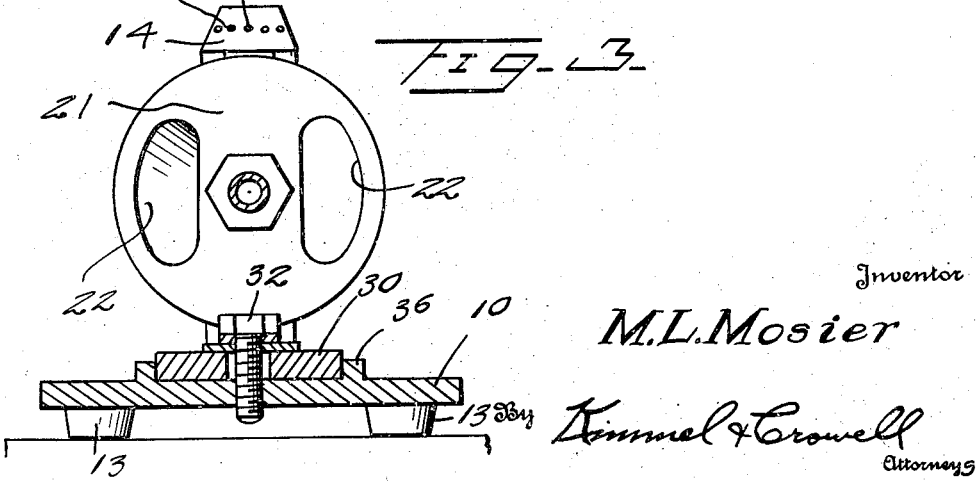
Inventor
M. L. Mosier
By Kimmel & Crowell
Attorneys Patented Feb. 15, 1949

2,461,913

UNITED STATES PATENT OFFICE 2,461,913

GAS BURNER AND SUPPORT THEREFOR

Murlin L. Mosier, Sioux City, Iowa

Application October 24, 1947, Serial No. 781,844

2 Claims. (Cl. 158—99)

This invention relates to a water heater and is particularly adapted for heating water tanks for chickens or animals where the tanks are located outdoors, to keep the water from freezing.

An object of this invention is to provide an improved heater or burner which can be used with various types of gaseous fuel and will provide an efficient heater or burner.

Another object of this invention is to provide a heater or burner of this kind which can be readily adjusted to provide for maximum combustion of the fuel.

A further object of this invention is to provide a heater or burner of this kind which will not readily clog up with dust particles which may be drawn into the mixing chamber or tube.

With the above and other objects in view, my invention consists in the arrangement, combination and details of construction disclosed in the drawings and specification, and then more particularly pointed out in the appended claims.

In the drawing:

Figure 1 is a plan view of a heater or burner constructed according to an embodiment of this invention, Figure 2 is a detail side elevation, partly in section, of the device, Figure 3 is a sectional view taken on the line 3—3 of Figure 2.

Referring to the drawing, the numeral 10 designates generally a base plate which is provided with supporting feet 13. The plate 10 has disposed thereabove a horizontally disposed mixing tube 11 which is supported from the base 10 by means of a supporting standard 12.

The tube 11 has secured to and extending from the forward end thereof a burner nozzle 14 of frustro-conical configuration, which is formed with a plurality of jet openings 15. The nozzle member 14 is threaded onto a nipple 16 which is threaded into a boss 17 carried by the upper side of the mixing tube 11. The mixing tube 11 at its inner or rear end has extending therefrom a flared member 18 which forms, with the tube 11, a mixing chamber 19. The rear or base end of the flared member 18 has extending therefrom a cylindrical wall 20 and a rear end wall 21 is formed integral with the wall 20 and is provided with a pair of openings 22 for admission of air into the chamber 19.

The wall 21 is formed with a central opening 23 within which a fuel nozzle 24 is slidably mounted. The nozzle 24 has threaded thereabout a nut 25 which limits the inward adjustment of the nozzle 24 through the wall 21. The nozzle 24 is threaded into a conventional valve 26 and the valve 26 is threaded onto a nipple 27 which is threaded into a boss 28. The boss 28 is carried by an upstanding vertical plate 29 which is formed integral with a lower adjustable horizontal plate 30. The plate 30 is formed with an elongated slot 31 and a clamping screw 32 extends through the slot 31 and is threaded into the base plate 10 so that the plate 30 may be secured in lengthwise adjusted position relative to the base plate 10.

The boss 28 has threaded thereinto a nipple 33 and an L-shaped pipe coupling 34 is threaded onto the nipple 33. The pipe coupling 34 is adapted to be connected to a source of fuel supply by means of a connector 35. As shown in Figure 3, the slide plate 30 engages between a pair of upstanding ribs 36 which are carried by the base plate 10 so that the plate 30 will be adjusted in a straight line relative to the plate 10, and the jet member 24 will be adjusted either inwardly or outwardly relative to the mixing chamber 19.

In the use and operation of this device, the connection 35 is connected to a source of fuel supply. The valve 26 is open to permit the discharge of fuel from the nozzle 24. With the discharge of fuel under pressure, in chamber 19, air will be drawn into this chamber through the openings 22. The mixture of air and fuel will pass lengthwise through the mixing tube 11 and then upwardly through the burner nozzle 14 from which the fuel is discharged through the jet openings 15.

I do not mean to confine myself to the exact details of construction herein disclosed, but claim all variations falling within the purview of the appended claims.

I claim:

1. A burner for gaseous fuel comprising a base, a mixing tube fixed to and parallel with said base, a burner nozzle extending from said tube adjacent one end thereof, a flared inner end carried by said tube, an apertured inner end wall carried by said inner end, a pair of upstanding lengthwise extending guide ribs carried by said base, an L-shaped nozzle carrier having a horizontal plate slidably engaging between said ribs, said plate having an elongated slot, a securing bolt engaging through said slot and extending into said base for holding said plate in adjusted position, said carrier having a vertical plate on the outer end of said horizontal plate, and a fuel discharge nozzle fixedly carried by said vertical plate and loosely engaging through said inner end wall.

2. A burner for gaseous fuel comprising a base, a mixing tube fixed to and parallel with said base, a burner nozzle extending from said tube adjacent one end thereof, a flared inner end carried by said tube, an apertured inner end wall carried by said inner end, a pair of upstanding lengthwise extending guide ribs carried by said base, an L-shaped nozzle carrier having a horizontal plate engaging between said ribs, said plate having an elongated slot, a securing bolt engaging through said slot and extending into said base for holding said plate in adjusted position, said carrier having a vertical plate on one end of said horizontal plate, a fuel discharge nozzle carried by said vertical plate and extending through said inner wall and a nut threaded on said fuel discharge nozzle for limiting the extension of said latter nozzle through said inner end wall.

MURLIN L. MOSIER.

REFERENCES CITED

The following references are of record in the file of this patent:

UNITED STATES PATENTS

| Number | Name | Date |
|---|---|---|
| 2,102,893 | Forster | Dec. 21, 1937 |

FOREIGN PATENTS

| Number | Country | Date |
|---|---|---|
| 413,260 | Germany | May 6, 1925 |
| 261,485 | Great Britain | Nov. 24, 1926 |